April 5, 1938.

M. SIMONS

Re. 20,690

PROCESS OF MAKING DIES

Original Filed March 16, 1933

INVENTOR
*Morris Simons*
BY
Dunn Fairbank Hirsch & Foster
ATTORNEYS

Reissued Apr. 5, 1938

Re. 20,690

UNITED STATES PATENT OFFICE 20,690

PROCESS OF MAKING DIES

Morris Simons, New York, N. Y., assignor to Carboloy Company, Inc., a corporation of New York Original No. 1,952,388, dated March 27, 1934, Serial No. 661,050, March 16, 1933. Application for reissue July 23, 1935, Serial No. 32,813

20 Claims. (Cl. 76—107)

My present invention considered from its broader aspects relates to the art of manufacturing drawing dies which include a wear element or apertured nib of low tensile strength but great hardness. This may consist mainly of tungsten carbide or equivalent material. A suitable composition for such a nib is one known in the trade as "Widia metal" which includes approximately 85 per cent of tungsten, 10 per cent of cobalt and 5 per cent of carbon. This product is extremely hard and very efficient for cutting purposes but lacks tensile strength. A drawing die is necessarily subjected to tensile stresses and great difficulty has been encountered in so reinforcing the wear element as to prevent it from cracking under these stresses.

More specifically the invention relates to an improvement in the type of drawing die and method of manufacturing it, disclosed in the patent of Aaron Simons, No. 1,904,698, issued April 18, 1933 and my Patent 1,935,821, issued Nov. 21, 1933.

According to that method the nib is placed in a metal casing of greater length than the nib and the casing is inserted in the passage of a die holder. The casing is then subjected to endwise compression, causing its metal to flow transversely to the direction of forces, so that the nib is firmly gripped and backed and reinforced against cracking under stresses tending to expand it.

By the present invention, I accomplish the application of far greater and more effective compression on the casing, which results in the application of extremely high tension on the nib; eliminates the necessity for polishing or otherwise pretreating the nib before it is fixed in its casing; insures uniform flow of the metal of the casing during the application of pressure and eliminates any unequal stresses in the composite plug and nib which result from the forging operation.

By the present invention also, the nib and casing form an article of manufacture, suitable for mounting in any holder device, it being unnecessary to permanently affix the casing in a die holder as an incident of forming the die.

The invention is characterized by a number of improved features of construction and operation among which are the hot forging rather than cold forging of the casing; the use of a specially constructed casing adapted to render the flow of the metal substantially uniform during the forging operation; the use of a casing made of deformable tool steel of high tensile strength and having high shrinking characteristics during the cooling, and the final operation of re-heating and drawing the composite casing and nib to eliminate any unequal stresses caused by the forging operation.

Figure 1:
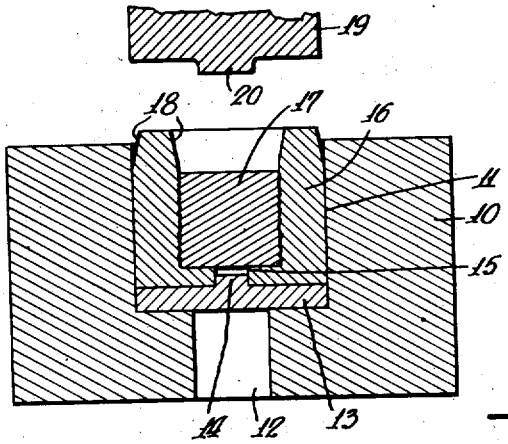
Figure 4:
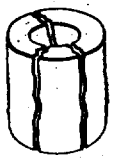
Figure 3:
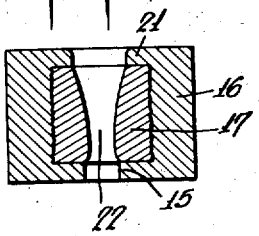
Figure 2:
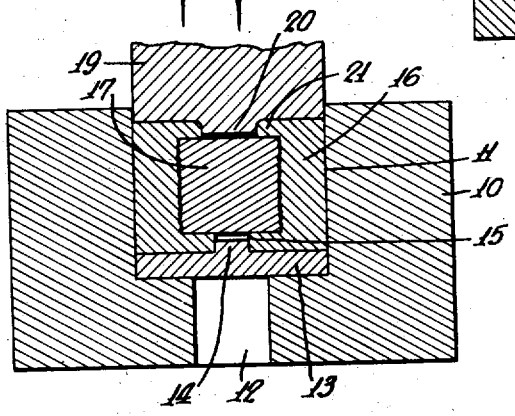

The invention may be more fully understood from the following description in connection with the accompanying drawing, wherein Fig. 1 is a vertical sectional view showing a nib and casing in position in a die holder prior to the forging operation, Fig. 2 is a similar view showing the deformation which takes place under the action of the forging press, Fig. 3 is a sectional view through a finished drawing die, and Fig. 4 is a perspective view showing a broken nib which may be remounted and reused in accordance with my process.

In the drawing, 10 designates a holder block of extremely hard material having a socket 11 therein which preferably tapers slightly from its mouth to its bottom and is adapted to receive the nib and its casing. A circular die plate 13 fits within and rests upon the bottom of the socket. Below the socket the holder has a passage 12 in the bottom whereby the die plate and the die and its casing may be forced out after the forging operation.

The die casing 16 may be placed within the socket and rest upon the disk 13. This casing is cup-shaped with a hole 15 in the bottom which may receive a central stud 14 on the die plate 13. Within the casing 16 is placed a preformed block 17 of tungsten-carbide or equivalent material. The upper circular end of the casing 16 above the block 17 is bevelled both internally and externally as indicated at 18 for a purpose which will more fully hereinafter appear. Disk 13 and casing 16 may be inserted into the socket in the holder 10 without the application of substantial force and the block of tungsten-carbide 17 may also be fitted within the casing 16 without the application of substantial force.

The disk 13 serves as an anvil plate backed by the member 10 and cooperates with the plunger 19 of a percussion press, to perform the forging operation, this plunger preferably has a central stud 20 on its underface which enters the top of the casing 16 and limits the inward flow of the metal of the latter.

In operation, the casing 16 and the nib or block 17 are fitted together and soaked in a furnace at a temperature of about 900 degrees F. for about one hour, for each inch of thickness of the casing wall. The nib and casing assemblage are then rapidly brought to a temperature in the order of 2,000 degrees F. or higher. They are placed in the die and forged. The forging is preferably done with a 50 ton percussion press so that the pressure applied when the plunger 19 descends upon the casing 16 is limited to that desired regardless of slight variations in the height of the nib casing. The force of the plunger transmitted endwise of the casing causes transverse flow of the material of the casing wall, thickening the latter and causing it to exert a very high pressure on the block of tungsten-carbide. As an incident of this forging operation, part of the material of the bevelled upper end of the casing is forced inwardly over the top of the block 17, providing a flange as shown at 21.

The double bevel at the upper end of the casing is effective in assuring transverse flow of the metal over the nib in both directions and preventing the upper portion of the wall of the casing from bending onto the block of tungsten-carbide and centralizing the surface against which the pressure is applied midway between the outer and inner surface of the wall.

I do not wish to be limited to the use of any exact composition of the tool steel which forms the casing, but it is important that it be de-formable and have high shrinkage characteristics under cooling. A high manganese steel may be mentioned as one example of a suitable material.

The casing and nib are kicked out of the die 10 while hot, by the application of a member projected up through the passage 12 against the bottom of the anvil plate 13. The socket 10 in the die is slightly tapered to facilitate such removal.

The casing and nib are then placed into a furnace for drawing, to eliminate any unequal stresses due to the plastic de-formation of the material which may have taken place during forging. They are drawn at a temperature which will give to the casing a Rockwell hardness of 42 to 45, which is approximately 450 Brinell.

I have mentioned the use of a 50 ton percussion press for forging purposes and while I do not wish to be limited to any definite pressures or methods of applying them, I have found that with a product so formed, forged, and treated, the tungsten-carbide block is placed under sufficient tension when cold that its tool steel casing will crack open by its inherent tension stress if the wall of the latter were thinned down to about $\frac{1}{16}$'', for instance, by making a longitudinal saw cut in the out surface. In a die where the casing is 1½ inches in external diameter and the nib .591'', it requires about 47,000 pounds pressure to force the nib out of the casing after sawing off the bottom of the latter. These effects are merely illustrative of the forces which are acting to reinforce the nib against expansion, i. e., to reinforce it against tensile stresses.

One of the important advantages of the present invention is that it will permit broken tungsten carbide nibs to be reassembled and remounted. The broken parts of the nib will be pressed together so tightly that the cracks will be invisible and will not leave any fins or marks on the wire being drawn. This is true even though the nib when mounted in a casing of the type formerly employed has broken into three or more pieces. Such a broken nib which may be reassembled in a casing and reprocessed by my invention is shown in perspective in Fig. 4.

When the ordinary nib breaks it may be mounted in accordance with the present invention and its use continued. In carrying out my invention I may deliberately break new nibs or form them initially in sections and assemble and mount them in accordance with my improved method and the danger of the nib thereafter breaking in use will be very materially reduced, if not entirely prevented.

It is characteristic of the process that the temperature of the nib and of the casing or jacket are always substantially uniform, thereby avoiding the possibility of unequal chilling of the casing by inserting a cold nib into a hot and expanded casing.

With the present invention, the die holder 10 forms no part of the final product, since the casing 16 is hard enough and exerts sufficient tension on the tungsten carbide block or nib to effectively reinforce it against expanding strains incident to a wire drawing operation, it only being necessary that the casing or jacket be held in some sort of a clamp which will prevent endwise displacement thereof under the strains incidental to the wire drawing operation.

Unlike prior methods of manufacture, the tungsten carbide block does not need to be polished before it is placed in the casing and better results, in fact, are obtained without any polishing operation. The block may be drilled or otherwise cut to form the wire drawing passageway 22 (Fig. 3) before it is assembled in the casing, if desired, although I have illustrated the processing of a solid block rather than a hollow nib in connection with one form of the present invention. In this case the passage 22 is formed and polished after the forging operation is completed.

Having thus described my invention, what I claim as new and desire to secure by Letters Patent is:—

1. A method of forming a drawing die, which includes inserting a hard nib of material having low tensile strength into a sleeve-like casing member of tool steel having high tensile strength but deformable and having high shrinking characteristics during cooling, heating the sleeve and nib, placing the sleeve and nib in a holder to limit lateral expansion of the sleeve during a forging operation, and while the sleeve and nib are still hot, forging the casing member by a percussive blow applied against the end of a sleeve in a wire drawing direction.

2. A method of forming a drawing die, which includes inserting a hard nib of low tensile strength into a sleeve-like casing member of tool steel having a high tensile strength but deformable and having high shrinking characteristics during cooling, heating the sleeve and nib, placing the sleeve and nib in a holder to limit lateral expansion of the sleeve during forging operation, and while the sleeve and nib are still hot, forging the casing member by a percussive blow applied against the end of a sleeve in a wire drawing direction, then removing the deformed sleeve and the highly compressed nib within it, reheating them, and drawing them at a temperature which will give a Brinell hardness of approximately 400 to 450.

3. The method of forming a drawing die, including the steps of preassembling a nib-forming block in a hollow metal casing, simultaneously heating the casing and block and while they are hot applying substantial compression force to said casing in a wire drawing direction while limiting the outward flow of the metal of the casing in a direction at right angles to the wire drawing direction, whereby the circumferential contraction of the inner wall of the casing places the nib under compression.

4. The method of forming a drawing die, including the steps of preassembling a nib-forming block in a hollow metal casing, simultaneously heating the casing and block and while they are hot applying substantial compression force to said casing in a wire drawing direction while limiting the outward flow of the metal of the casing in a direction at right angles to the wire drawing direction, whereby the circumferential contraction of the inner wall of the casing places the nib under compression, and then reheating the nib and casing to eliminate unequal stresses due to the compression applying operation.

5. The method of forming a drawing die, including the steps of preassembling a nib in a hollow deformable tool steel casing, heating the casing and nib, and then hot-forging the casing by percussively applying substantial compression force to said casing in a wire drawing direction while limiting the outward flow of the metal of the casing in a direction at right angles to the wire drawing direction.

6. The method of forming a drawing die, including the steps of preassembling a nib in a hollow deformable tool steel casing, heating the casing and nib, and then hot-forging the casing by percussively applying substantial compression force to said casing in a wire drawing direction while limiting the outward flow of the metal of the casing in a direction at right angles to the wire drawing direction, then reheating the nib and casing to eliminate unequal stresses due to the forging operation.

7. The method of forming a drawing die, including the steps of preassembling a nib in a hollow deformable tool steel casing, heating the casing and nib, and then hot-forging the casing by percussively applying substantial compression force to said casing in a wire drawing direction while limiting the outward flow of the metal of the casing in a direction at right angles to the wire drawing direction, then reheating the nib and casing to eliminate unequal stresses due to the forging operation, and so treating the casing as to give it a Rockwell hardness in the order of 42 to 45.

8. The method of forming a drawing die, which includes the steps of assembling a nib of tungsten carbide in a tool steel sleeve of the character which has high shrinkage characteristics when cooling, soaking the sleeve and the nib at a temperature of about 900° F. raising the temperature rapidly to about 2000° F., placing the nib and sleeve in a holder, and hot-forging the sleeve by a percussive blow applied to one end thereof to cause it to grip the nib.

9. A method as set forth in claim 1, wherein the outer surface of the nib in contact with the sleeve is unpolished.

10. A method of repairing longitudinally split tungsten carbide nibs for drawing dies, which includes the steps of reassembling the broken sections of the nib in a deformable tool steel casing having high shrinkage characteristics during cooling, heating the nib and casing, and hot-forging the casing to cause the assembled pieces of the broken nib to be forced so tightly one against the other as to conceal the previous lines of cleavage between them.

11. A method of repairing longitudinally split tungsten carbide nibs for drawing dies, which includes the steps of reassembling the broken sections of the nib in a deformable tool steel casing having high shrinkage characteristics during cooling, heating the nib and casing, and hot-forging the casing to cause the assembled pieces of the broken nib to be forced so tightly one against the other as to conceal the previous lines of cleavage between them, and then reheating the casing and nib to eliminate unequal stresses caused by the forging operation, and then rehardening the casing.

12. A method of mounting sectional or split nibs for drawing dies which includes the steps of: assembling the components of a complete nib in a hollow metal casing, heating the nib and casing, and hot forging the casing to compress the nib components tightly and permanently against one another, whereby the assembly simulates the performance of a unitary nib.

13. A method of mounting sectional or split nibs for drawing dies which includes the steps of: assembling the components of a complete nib in a hollow steel casing, heating the nib and casing, and hot forging the casing to compress the nib components tightly and permanently against one another, whereby the assembly simulates the performance of a unitary nib, and heat treating the assembly to minimize unequal stresses and to impart requisite mechanical properties to the casing and compression thereof about the nib.

14. A method of mounting sectional or split nibs for drawing dies which includes the steps of: assembling the components of a complete nib in a hollow metal casing, heating the assembled nib and casing and while they are hot applying compression to said casing in a wire drawing direction to upset the casing metal against the end of the assembled nib while limiting the radial outward flow of the casing metal, whereby the radial contraction of the inner casing wall combined with said upsetting, compresses the nib components axially and radially so tightly and permanently against one another that the assembly simulates the performance of a unitary nib.

15. A method of mounting sectional or split nibs for drawing dies which includes the steps of: assembling the components of a complete nib in a cup-shaped steel casing, heating the assembled nib and casing and while they are hot applying compression to said casing in a wire drawing direction to upset the open end of the casing against the assembled nib while limiting radial outward flow of the casing metal whereby the radial contraction of the inner casing wall combined with said upsetting compresses the nib components axially and radially so tightly against one another that the assembly simulates the performance of a unitary nib, and heat treating the assembly to minimize unequal stresses and to impart requisite mechanical properties to the casing and compression thereof about the nib.

16. A method of mounting sectional or split nibs for drawing dies which includes the steps of: assembling the components of a complete nib in a cup-shaped steel casing of attenuated wall thickness adjacent the open end, heating the assembled nib and casing and while they are hot applying compression to said casing in a wire drawing direction to upset the open end of the casing against the assembled nib while limiting radial outward flow of the casing metal whereby the radial contraction of the inner casing wall combined with said upsetting compresses the nib components axially and radially so tightly against one another that the assembly simulates the performance of a unitary nib, and heat treating the assembly to minimize unequal stresses and to impart requisite mechanical properties to the casing and compression thereof about the nib.

17. The method of forming a drawing die including the steps of: preassembling a nib-forming block in a hollow metal casing, heating the casing and block and while they are hot applying compression to said casing in a wire drawing direction to upset the casing against the end of the block while limiting the radial outward flow of the casing metal whereby the radial contraction of the inner casing wall combined with said upsetting places the nib-forming block under combined axial and radial compression.

18. A method of forming a drawing die including the steps of: preassembling a nib-forming block in a cup-shaped steel casing, heating the casing and block and while they are hot applying compression to the casing in a wire drawing direction to upset the open end of the casing against the corresponding end of the block while limiting the radial outward flow of the casing metal whereby the radial contraction of the inner casing wall combined with said upsetting places the nib-forming block under combined axial and radial compression.

19. A method of forming a drawing die including the steps of: preassembling a nib-forming block in a cup-shaped steel casing of attenuated wall thickness adjacent the open end, heating the casing and block and while they are hot applying compression to the casing in a wire drawing direction to upset the open end of the casing against the corresponding end of the block while limiting the radial outward flow of the casing metal whereby the radial contraction of the inner casing wall combined with said upsetting places the nib-forming block under combined axial and radial compression.

20. A method of forming a drawing die including the steps of: preassembling a nib-forming block in a cup-shaped steel casing, heating the casing and block and while they are hot applying compression to the casing in a wire drawing direction to upset the open end of the casing against the corresponding end of the block while limiting the radial outward flow of the casing metal whereby the radial contraction of the inner casing wall combined with the said upsetting places the nib-forming block under combined axial and radial compression, and heat treating the assembly to minimize unequal stresses and to impart requisite mechanical properties to the casing and compression thereof about the nib.

MORRIS SIMONS.